United States Patent
Bowman et al.

(10) Patent No.: US 12,032,116 B1
(45) Date of Patent: Jul. 9, 2024

(54) GEOLOCATING SOURCES OF ACOUSTIC SIGNALS WITH A BALLOON-BORNE AEROSEISMOMETER

(71) Applicants: National Technology & Engineering Solutions of Sandia, LLC, Albuquerque, NM (US); California Institute of Technology, Pasadena, CA (US)

(72) Inventors: Daniel Bowman, Corrales, NM (US); Jerry Rouse, Virginia Beach, VA (US); Siddharth Krishnamoorthy, Pasadena, CA (US); Attila Komjathy, La Crescenta, CA (US); James Cutts, Pasadena, CA (US)

(73) Assignees: National Technology & Engineering Solutions of Sandia, LLC, Albuquerque, NM (US); California Institute of Technology, Pasadena, CA (US)

( * ) Notice: Subject to any disclaimer, the term of this patent is extended or adjusted under 35 U.S.C. 154(b) by 327 days.

(21) Appl. No.: 17/694,062

(22) Filed: Mar. 14, 2022

(51) Int. Cl.
*G01W 1/08* (2006.01)
*B64B 1/40* (2006.01)
*G01S 19/01* (2010.01)
*G01V 1/01* (2024.01)
*G01V 7/16* (2006.01)
*H04W 4/021* (2018.01)

(52) U.S. Cl.
CPC ................. *G01W 1/08* (2013.01); *B64B 1/40* (2013.01); *G01S 19/01* (2013.01); *G01V 1/01* (2024.01); *G01V 7/16* (2013.01); *H04W 4/021* (2013.01)

(58) Field of Classification Search
CPC .......... G01W 1/08; B64B 1/40; H04W 4/021
USPC ........................................................ 342/417
See application file for complete search history.

(56) References Cited

U.S. PATENT DOCUMENTS

| 10,365,089 B1 | 7/2019 | Titovich |
| 10,578,440 B1 * | 3/2020 | Titovich ................. G05D 1/101 |
| 2020/0213728 A1 * | 7/2020 | Lopatka ................ G01S 3/8083 |

FOREIGN PATENT DOCUMENTS

| EP | 2544302 A1 * | 1/2013 | ............. H01Q 1/125 |
| EP | 3477964 B1 * | 3/2021 | ........... G10K 11/341 |

OTHER PUBLICATIONS

Bowman, et al., "Infrasound in the Middle Stratosphere Measured With a Free-Flying Acoustic Array", Geophysical Research Letters, Nov. 19, 2015, pp. 1-8.

(Continued)

*Primary Examiner* — Harry K Liu
(74) *Attorney, Agent, or Firm* — Calfee, Halter & Griswold LLP; Samantha Updegraff; Merle W. Richman

(57) ABSTRACT

Various embodiments described herein provide for a balloon-borne aeroseismometer that can detect infrasonic signals and concurrent vibrations caused by the infrasonic signals. Through a set of motion sensors that can detect acceleration in three planes, the aeroseismometer can determine the direction of vibration and thus determine a travel path of the infrasonic signal relative to the aeroseismometer. The aeroseismometer can also translate the direction of the source from a reference frame of the aeroseismometer to an external reference frame, such as a planetary coordinate system, in order to identify potential locations of a source of the infrasonic signals.

20 Claims, 6 Drawing Sheets

(56) References Cited

OTHER PUBLICATIONS

"New Sandia Balloon-Borne infrasound Sensor Array Detects Explosions", Retrieved at: <<https://newsreleases.sandia.gov/infrasound_balloons/>>, Jan. 11, 2018, pp. 1-6.

Bowman, Daniel C., "Flight Test of a Balloon-Borne Aeroseismometer", Retrieved at: <<https://www.osti.gov/servlets/purl/1813662>>, Aug. 23, 2021, pp. 1-22.

Bowman, et al., "A Balloon-Borne Aeroseismometer for Locating Seismic Activity on Venus", 52nd Lunar and Planetary Science Conference 2021, Mar. 15, 2021, 1 page.

"Seismological Society of America Technical Sessions", Retrieved at <<https://www.seismosoc.org/wp-content/uploads/2021/03/SSA-2021-Program-for-SRL.pdf>>, Apr. 19, 2021, pp. 1-267.

Garcia, et al., "An Active Source Seismo-Acoustic Experiment using Tethered Balloons to Validate Instrument Concepts and Modleling Tools for Atmospheric Seismology", Geophys. J. Int., vol. 225, Dec. 12, 2020, pp. 186-199.

* cited by examiner

GEOLOCATING SOURCES OF ACOUSTIC SIGNALS WITH A BALLOON-BORNE AEROSEISMOMETER

STATEMENT OF GOVERNMENTAL INTEREST

This invention was made with Government support under Contract No. DE-NA0003525 awarded by the United States Department of Energy/National Nuclear Security Administration and under Grant No. 80NMO0018D0004, awarded by NASA (JPL). The U.S. Government has certain rights in the invention.

BACKGROUND

The term "infrasound" refers to sound waves with a frequency below the lower limit of human audibility (e.g., below 20 Hz). Infrasonic signals can travel great distances and remain detectable, especially in the atmosphere. Thus, airborne infrasonic detectors are used to detect infrasonic signals that may occur as the result of volcanos, earthquakes, severe storms, and other geophysical phenomena. In addition, infrasonic detectors have been employed to detect infrasonic signals associated with nuclear detonation and rocket launches. Because infrasonic detectors detect changes in pressure, which is a scalar value, airborne infrasonic detectors are conventionally unable to determine the direction of arrival of infrasonic signals, and thus are unable to estimate a location of a source of the infrasonic signals relative to the detector. This problem can be solved using ground-based detection systems, where sets of detectors are positioned at fixed distances from each other. Differences between time of arrival of infrasonic signals at the sets of detectors can be used to determine the direction of propagation of the signals. Ground-based detection systems, however, are not well-suited for use in areas covered by water. As indicated previously, a challenge of measuring infrasonic signals using airborne infrasonic detectors (e.g., infrasonic detectors positioned on airborne balloons) is that it is conventionally not possible to determine the direction of arrival of the infrasonic signals using such detectors.

SUMMARY

The following is a brief summary of subject matter that is described in greater detail herein. This summary is not intended to be limiting as to the scope of the claims.

Various embodiments described herein provide for a balloon-borne aeroseismometer that can detect infrasonic signals and concurrent vibrations caused by the infrasonic signals being incident upon the balloon. Through a set of accelerometers that can detect acceleration in three planes, the aeroseismometer can determine the direction of vibration, relative to the aeroseismometer, in a reference frame of the aeroseismometer and thus determine the direction of arrival of the infrasonic signals in the reference frame. The aeroseismometer can also translate the travel path of the infrasonic signals relative to the aeroseismometer from the reference frame of the aeroseismometer to an external reference frame (such as a planetary coordinate system) in order to identify a potential set of locations for the source of the infrasonic signals (e.g., in latitude/longitude coordinates), where the potential set of locations are along the determined travel path of the infrasonic signals relative to the aeroseismometer. When a second balloon-borne aeroseismometer detects the infrasonic signals and corresponding vibrations caused thereby, the second aeroseismometer can determine a second travel path of the infrasonic signals relative to the second aeroseismometer. A source of the infrasonic signals can be determined by identifying a point of intersection of the aforementioned travel paths.

In one or more embodiments, a system can include a memory that stores computer-executable instructions and a processor that executes the computer-executable instructions, where the computer-executable instructions cause the processor to perform operations including receiving, from an acoustic sensor mounted on an airborne balloon, an indication that an infrasonic signal was detected by the acoustic sensor. The operations also include receiving, from a set of motion sensors, a signal indicating that a vibration occurred concurrent with the infrasonic signal being incident upon the balloon, wherein the signal comprises directional information relating to movement in each of the three planes of a reference frame of the balloon. The operations also include determining, relative to the airborne balloon, a travel path of the infrasonic signals, where the travel path is determined based on the directional information.

In another embodiment, a method includes receiving a first signal from an acoustic sensor mounted on an airborne balloon, the first signal indicating that an infrasonic signal was detected by the acoustic sensor. The method also includes receiving, from an inertial measurement unit, a second signal indicating that a vibration occurred with respect to the airborne balloon, where the vibration occurred concurrent with the infrasonic signal being detected by the acoustic signal, wherein the second signal comprises information relating to an amplitude of vibration in each of the three planes of a reference frame of the airborne balloon. The method also includes calculating, based on the information relating to the amplitude of vibration in each of the three planes of the reference frame, an orientation of the vibration with respect to the reference frame. The method further includes determining a travel path of the infrasonic signal relative to the reference frame, wherein the direction is coincident with the orientation of the vibration.

In another embodiment, an aeroseismometer mounted to an airborne balloon includes an acoustic sensor that detects an infrasonic signal. The aeroseismometer also includes an inertial measurement unit that detects a vibration, where the inertial measurement unit detects the vibration concurrently with the acoustic sensor detecting the infrasonic signal, wherein the inertial measurement unit determines amplitudes of vibration in each of the three planes of a reference frame of the aeroseismometer. The aeroseismometer additionally includes a computing device that computes an orientation of the vibration relative to the reference frame based on the amplitudes of vibration in each of the three planes. The computing device can also compute a second orientation of the vibration relative to a planetary coordinate system based on the first orientation of the vibration relative to the reference frame. The computing device additionally determines a travel path of the infrasonic signal, relative to the aeroseismometer and in the planetary coordinate system, based on the second orientation and a location of the aeroseismometer.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
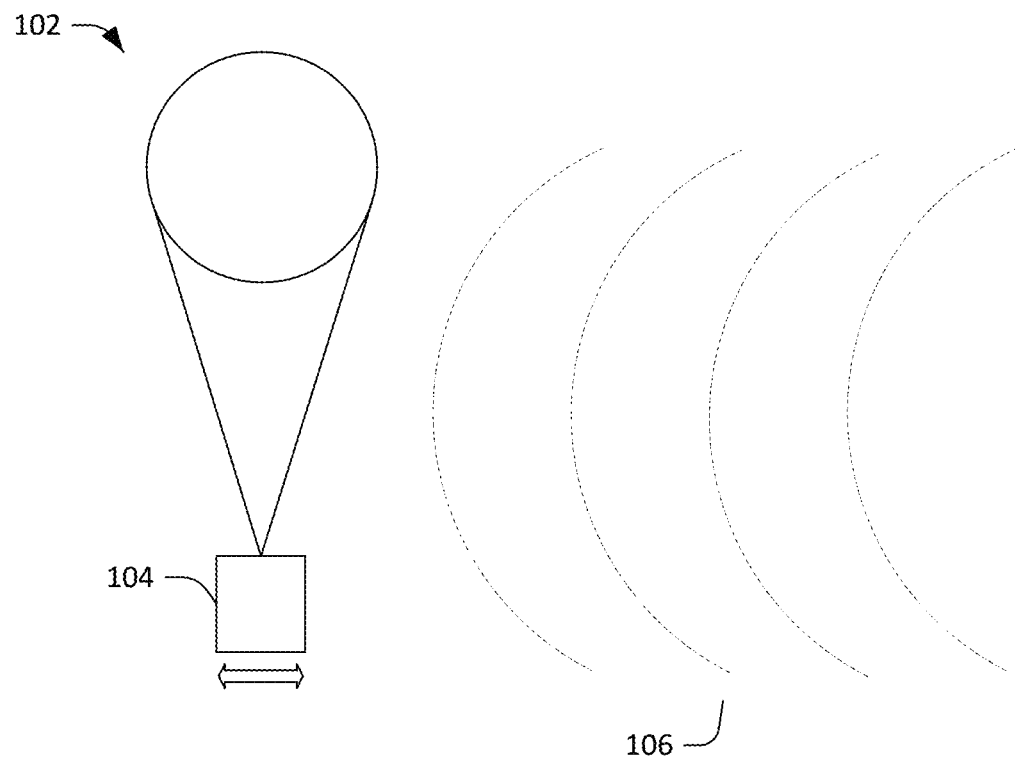
FIG. 1 is an exemplary embodiment of a balloon-borne aeroseismometer that detects vibrations caused by infrasonic signals being incident upon the balloon.

Various technologies pertaining to balloon-borne aeroseismometry, where a location or set of potential locations of a source of infrasonic signals can be determined based upon vibration measurements, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality described as being carried out by certain system components may be performed by multiple components. Similarly, for instance, a component may be configured to perform functionality described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something and is not intended to indicate a preference.

With reference to FIG. 1, a schematic that illustrates an airborne balloon 102 having an aeroseismometer 104 coupled thereto is presented. As will be described in greater detail below, the aeroseismometer 104 is configured to simultaneously detect acoustic signals travelling through the atmosphere and vibrations of the balloon 102 caused by the acoustic signals being incident upon the balloon 102. To that end, and as will be described in greater detail below, the aeroseismometer 104 includes an acoustic sensor and motion sensors (which can optionally be included in an inertial measurement unit (IMU) of the aeroseismometer 104).

The balloon 102 is a free atmospheric balloon, that is, it is not tethered to the surface of the Earth (or other planet) and it is not deployed in space or in a liquid. In an example, the balloon 102 is released and allowed to roam freely. In another example, the balloon 102 is tethered to the ground. The balloon 102 can include componentry that is configured to transmit data to ground-based stations. Additionally or alternatively, the balloon 102 can include componentry that is configured to transmit data to other balloons or to one or more satellites in orbit around the Earth (or other planet) over which the balloon 102 is deployed, or the balloon 102 may record data directly to onboard storage.

The aeroseismometer 104 can detect sonic signals at a range of frequencies, including those frequencies below the range of human hearing (e.g., below 20 Hz) that are commonly called infrasonic frequencies. Infrasonic signals (sound waves) are characterized by an ability to propagate around obstacles with little dissipation, and by an ability to propagate over vast distances through the Earth's atmosphere as a result of very low atmospheric absorption and of refractive ducting that enables propagation by way of multiple bounces between the surface of the Earth and other regions of the atmosphere. Infrasonic signals also have the ability to penetrate through solid matter. Due to such properties, geophysical activity can be detected through measurement and analysis of infrasonic signals, where geophysical activity includes earthquakes, volcanoes, and the like. Moreover, the aeroseismometer 104 can detect geophysical activity, even when the aeroseismometer 104 is airborne. Additionally, the aeroseismometer 104 is also capable of being used to detect nuclear explosions and rocket launches, even from great distances, based upon measured infrasonic signals. Airborne detectors to detect and map geophysical activity can also be used in planetary exploration—both Venus and Mars have atmospheres capable of balloon-borne instrument packages. With particular respect to Venus, balloon-borne instrument packages are ideal, as the temperature and pressure on the surface are extremely high.

As noted above, however, acoustic sensors found in aeroseismometers are scalar sensors that can detect the existence, frequency and/or amplitude of infrasonic signals, but cannot, by themselves, determine information related to the direction of arrival of infrasonic signals. Thus, acoustic sensors, by themselves, cannot be used to estimate a direction of a sound source relative to the acoustic sensors, and thus cannot be used (by themselves) to estimate a unique location of a source of infrasonic signals relative to the acoustic sensors without at least three observations of the same signal on separate balloons. As will be described in greater detail below, however, acoustic sensors can be used in combination with accelerometers to detect infrasonic signals and determine a travel path of the infrasonic signals relative to the balloon 102 (a single balloon). In addition, different sets of acoustic sensors and accelerometers can be used in combination to estimate a source of infrasonic signals.

With more specificity, sound waves are associated with repeating patterns of high pressure and low-pressure regions moving through a medium. Propagating infrasonic signals 106 exert a force on the balloon 102 (and the aeroseismometer 104) that causes both to vibrate back and forth in the direction in which the infrasonic signals 106 propagate.

Since the infrasonic signals 106 likely originated at a relatively large distance from the balloon 102, the wavefront of the infrasonic signals 106 can be approximated to be planar, and thus the balloon 102 and aeroseismometer 104 vibrate within the same plane.

In an embodiment, the aeroseismometer 104 can measure the vibration caused by the infrasonic signals 106, and, in particular, can measure accelerations of the vibrations in each of the three orthogonal planes of a reference frame of the aeroseismometer 104. Based on the measured accelerations in each of the three planes, a direction of vibration can be determined, where the direction of vibration can be assumed to be coincident with a travel path of the propagated signals 106. Since sound waves are characterized by propagating patterns of high and low-pressure regions, and either a low or a high-pressure region may be the first region to contact the aeroseismometer 104, it is not possible to determine a direction of propagation of the infrasonic signals 106 along the travel path. Therefore, the aeroseismometer 104, when operating independently, can determine the travel path of the propagated signals 106, but cannot determine a direction of travel of the propagated signals 106 along the travel path.

As indicated previously, the aeroseismometer 104 determines the travel path of the propagated signals 106 in a reference frame that is unique to the aeroseismometer 104. The balloon 102, however, is mobile, and can rotate, tilt, and travel in the atmosphere. Thus, the reference frame of the aeroseismometer 104 is not fixed with respect to an external reference frame, such as a planetary coordinate system (geographic coordinate system, geocentric coordinate system, Venus coordinate system, etc.). The aeroseismometer 104 can be configured to translate the travel path of the propagated signals 106 from the reference frame of the aeroseismometer 104 into the external frame. To enable the translation, the aeroseismometer 104 can use information from an inertial measurement unit that tracks the movement of the aeroseismometer 104 over time. In an example, the aeroseismometer 104 can also use information from a Global Positioning System (GPS) to determine the locations of the aeroseismometer 104 and balloon 102 over time or from other satellite location systems, ground-based radar, and other sources from which location information can be derived.

When the aeroseismometer 104 translates the travel path of the propagated signals 106 from the reference frame of the aeroseismometer 104 into the external reference frame, the direction of arrival can be used to determine a location of the source of the infrasonic signals 106 or at least determine a set of potential locations of the source, where the set of potential locations can be assumed to be coincident with the travel path of the infrasonic signals 106.

In an embodiment, the infrasonic signals 106 may arrive at the aeroseismometer 104 after bouncing off the ground or some atmospheric nonlinearity, and thus the travel path may have a Z axis component (e.g., altitudinal component) in the external reference frame. In an embodiment, once the travel path of the infrasonic signals 106 has been translated to the external reference frame, the aeroseismometer 104 can ignore the z-axis or altitudinal component of the travel path; therefore, the aeroseismometer 104 can assume that the travel path is along a line about the surface of the Earth, and that the source of the infrasonic signals 106 is located somewhere on such line. Thus, the potential locations of the source of the infrasonic signals 106 can be represented and identified by latitude and longitude coordinates, or other geographic coordinate system or planetary coordinate system.

The aeroseismometer 104, by itself, can determine that the source of the infrasonic signals 106 falls somewhere in a plane that extends from the Earth's surface to space, oriented along the direction of arrival calculated by the aeroseismometer. When a second aeroseismometer is used that is displaced by some distance (e.g., several miles) from the aeroseismometer, a more precise location can be determined at the intersection of travel paths of the infrasonic signals 106 relative to the two aeroseismometers. The aeroseismometers on the balloons can communicate computed travel paths to ground-based stations or satellites, or via direct radio or microwave communications, and an estimate of a location of the source can be computed at the ground-based stations or satellites. In other embodiments, the aeroseismometers can communicate computed travel paths to each other by way of a suitable network connection between the aeroseismometers, and one or more of the aeroseismometers can compute the estimated location of the source of the infrasonic signals 106.

Figure 2:
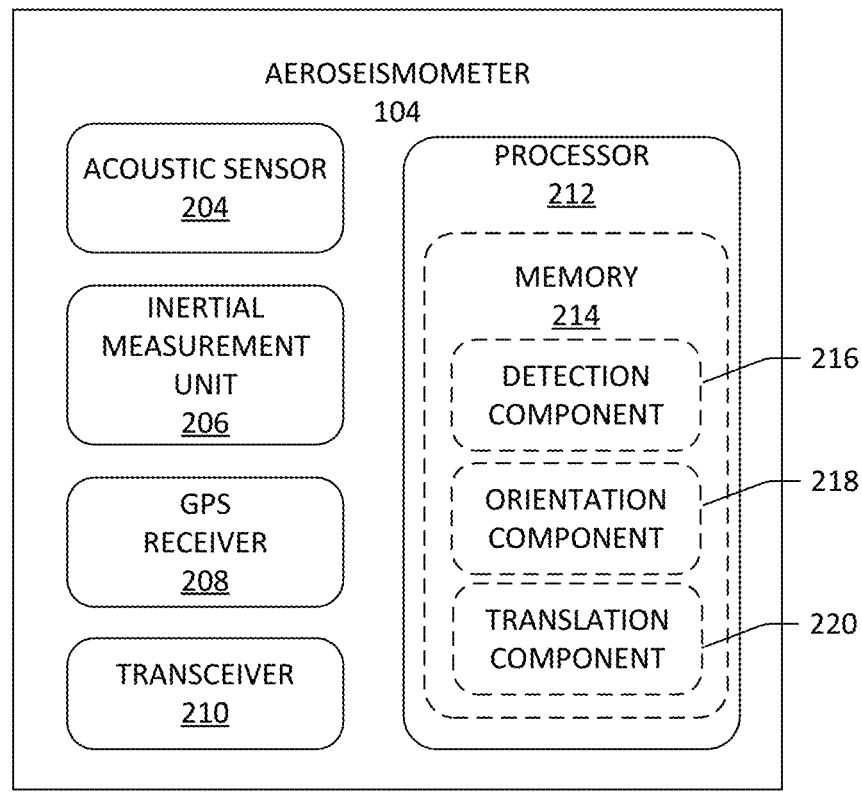
FIG. 2 is a functional block diagram of an aeroseismometer that is configured to compute the direction of arrival of an infrasonic signal.

Turning now to FIG. 2, illustrated is a functional block diagram of the aeroseismometer 104. The aeroseismometer 104 includes an acoustic sensor 204 that can detect infrasound and an inertial measurement unit (IMU) 206 that can detect and measure accelerations of vibration of the balloon 102 (and thus the aeroseismometer 104) in each of the three orthogonal planes. The aeroseismometer 104 can also optionally include a GPS receiver 208 that can receive GPS signals from one or more GPS satellites and a transceiver 210 to facilitate communications with a ground station, satellite, or other balloons. The aeroseismometer 104 can also include a processor 212 and memory 214, where the memory has several components stored therein that are executed by the processor 212. The components include a detection component 216, an orientation component 218, and a translation component 220.

The acoustic sensor 204 can be a sensor that can detect infrasonic signals having frequencies between 0.01 Hz and 20 Hz. In some embodiments, the acoustic sensor 204 can also detect noises outside of the infrasonic range. In an embodiment, the acoustic sensor 204 can be a microelectromechanical (MEMS) differential pressure transducer sensor. The acoustic sensor 204 can detect the amplitude and/or frequency of infrasonic signals.

The IMU 206 can be an electronic device that measures and reports a force, angular rate, and orientation of a body (e.g., the aeroseismometer 104). For instance, the IMU 206 can include at least one of an accelerometer, a gyroscope, or a magnetometer. The IMU 206 can detect linear acceleration using one or more accelerometers and rotational acceleration using one or more gyroscopes. The IMU 206 may also include a magnetometer that can be used as a heading reference. In an example, the IMU 206 includes an accelerometer, gyroscope, and magnetometer per axis for each of the three orthogonal axes: pitch, roll, and yaw.

While illustrated as being included in the aeroseismometer 104, it is to be understood that the IMU 206 can be included in an instrument package of the balloon 102, in a navigation system of the balloon 102, etc., and can be communicably coupled to the aeroseismometer 104 (such that measurements generated by the IMU 106 are reported to the aeroseismometer 104).

In an example, the acoustic sensor 204 detects the infrasonic signals 106 and optionally determines the frequency and/or amplitude of the infrasonic signals 106. Concurrently, the IMU 206 detects vibrations that are potentially caused by the infrasonic signals 106 detected by the acoustic sensor 204. The detection component 216 receives signals generated by the acoustic sensor 204 and the IMU 206 and determines whether the vibrations represented in the signal output by the IMU 206 are due to the infrasonic signals 106 detected by the acoustic sensor 204 (and represented in the signal output by the acoustic sensor 204). The detection component 216 makes such determination by comparing the timing of the detection events, and also other factors which can lead to a determination that the detected vibration is due to the infrasonic signals 106 being incident upon the balloon 102. For example, when the IMU 206 detects vibrations but there are no infrasonic signals detected by the acoustic sensor 204 (within a predefined time before or after the vibration being detected), the vibration is not likely to be caused by infrasonic signals. On the other hand, when the acoustic sensor 204 detects infrasonic signals, and at the same time or within a predefined time frame (e.g., <1s) very shortly before or after the IMU 206 detects vibration (e.g., some threshold amount of vibration), the detection component 216 can determine that the vibration and infrasonic signals are linked (e.g., the vibration is caused by the infrasonic signals being incident upon the balloon 102). In another example, the detection component 216 identifies whether the infrasonic signals detected by the acoustic sensor 204 and the vibration detected by the IMU 206 are linked based on a comparison of the amplitude and/or frequency of the infrasound and the amplitude and/or period of the vibration.

In response to the detection component 216 determining that the infrasonic signals and the vibration are linked, the orientation component 218 can compute the direction of arrival of the infrasonic signals 106 (in a reference frame of the aeroseismometer 104) relative to the aeroseismometer 104, where direction of arrival is computed based upon the orientation of the vibration detected by the IMU 206. The IMU 206 can provide the acceleration detected by each accelerometer of a set of three accelerometers oriented in three axes. In an embodiment, the planes can be orthogonal to each other. The orientation component 218 can determine a vibration detection based on the amplitude of the acceleration detected by each of the three accelerometers. Since the movement due to a vibration occurs in two opposite directions and since it is not possible to determine which direction the infrasonic signals originated from definitively, the computed travel path lacks directional data (e.g., the direction of propagation of the infrasonic signals has a 180 degree ambiguity).

The translation component 220 receives data that identifies the travel path and translates the travel path into an external reference frame, such as a planetary coordinate system. Accordingly, the translation component 220 computes the travel path of the infrasonic signals 106 relative to the aeroseismometer 104 over the surface of the Earth. In connection with translating the travel path into the external reference frame, the IMU 206 can track the movement (translation and rotational) of the balloon 102 over time to determine the orientation and position of the aeroseismometer 104 with respect to the planetary coordinate system. The translation component 220 can then translate the orientation of the vibration detected by the IMU 206 into a travel path with respect to the planetary coordinate system. The translation component 220 can perform the translation based on the relative orientation of the aeroseismometer 104 at the time the vibration was detected by the IMU 206. In some embodiments, the vibrations due to the infrasonic signals may occur over a period of a few seconds, in which time the aeroseismometer 104 could be rotating, or swinging. In such embodiments, the translation component 220 can perform the translation based on the orientation of the aeroseismometer 104 at the time of the first detection of the vibration. In other examples, the translation component 220 repeatedly translates the direction of arrival, and the directions can be averaged (and optionally associated with a probability distribution).

In an embodiment, once the translation is performed by the translation component 220, the transceiver component 210 transmits a signal comprising information related to the travel path relative to the aeroseismometer 104 to one or more of a ground station or satellite within range of the transceiver 210, or it records the information to a data storage device on the balloon. The transceiver 210 can also transmit location information representing the location of the aeroseismometer 104 at the time the infrasound was detected. The aeroseismometer 104 can receive location information from the GPS receiver 208. In other embodiments, the aeroseismometer 104 can approximate the location based on tracking the movement of the aeroseismometer 104 based on signals generated by the IMU 206. A computing device on the ground or in the satellite can then determine the travel path of the infrasonic signals 106 based on the translated orientation of the vibration and the current location of the aeroseismometer 104.

Figure 3:
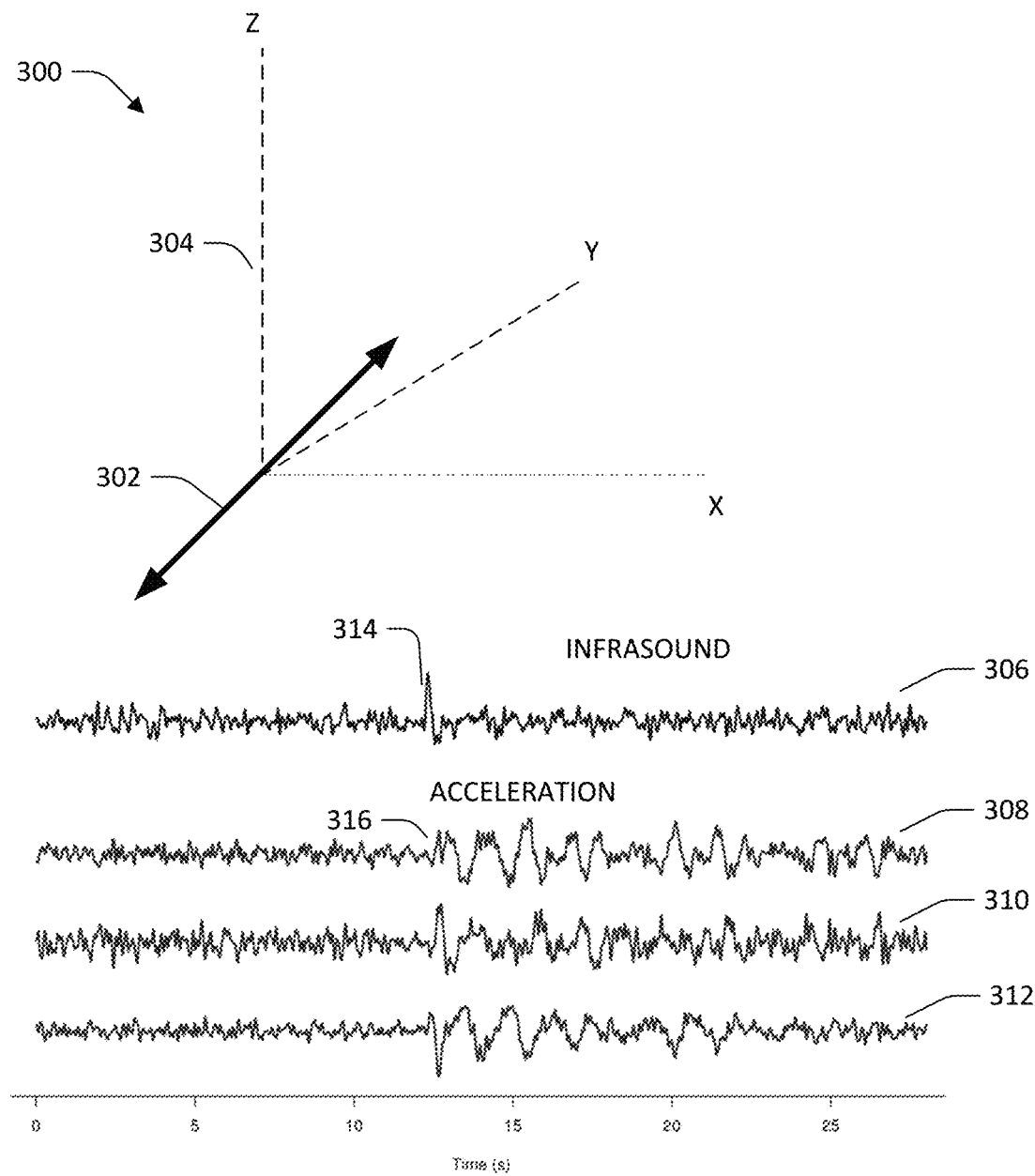
FIG. 3 is a plot that depicts a signal output by an acoustic sensor and corresponding vibration measurements output by an inertial sensor.

Turning now to FIG. 3, a plot that depicts infrasonic measurements generated by the acoustic sensor 204 and vibration measurements in the three planes generated by the IMU 206 is presented. In FIG. 3, a representation of an acoustic signal 306 from the acoustic sensor 204 is shown. At 314, there is a noticeable spike in infrasound in the acoustic signal 306, which indicates that an infrasonic signal was detected by the acoustic sensor 204. At the same time, an acceleration is detected at 316 in signals 308, 310, and 312 from IMU 206, where the signals 308, 310, and 312 corresponding to accelerometers that output measurements related to the three different orthogonal planes. Based on the acceleration detected in signals 308, 310 and 312, the orientation component 218 can determine the orientation of the vibration (shown by the line 302 with respect to the reference frame 304 of the aeroseismometer 104).

Figure 4:
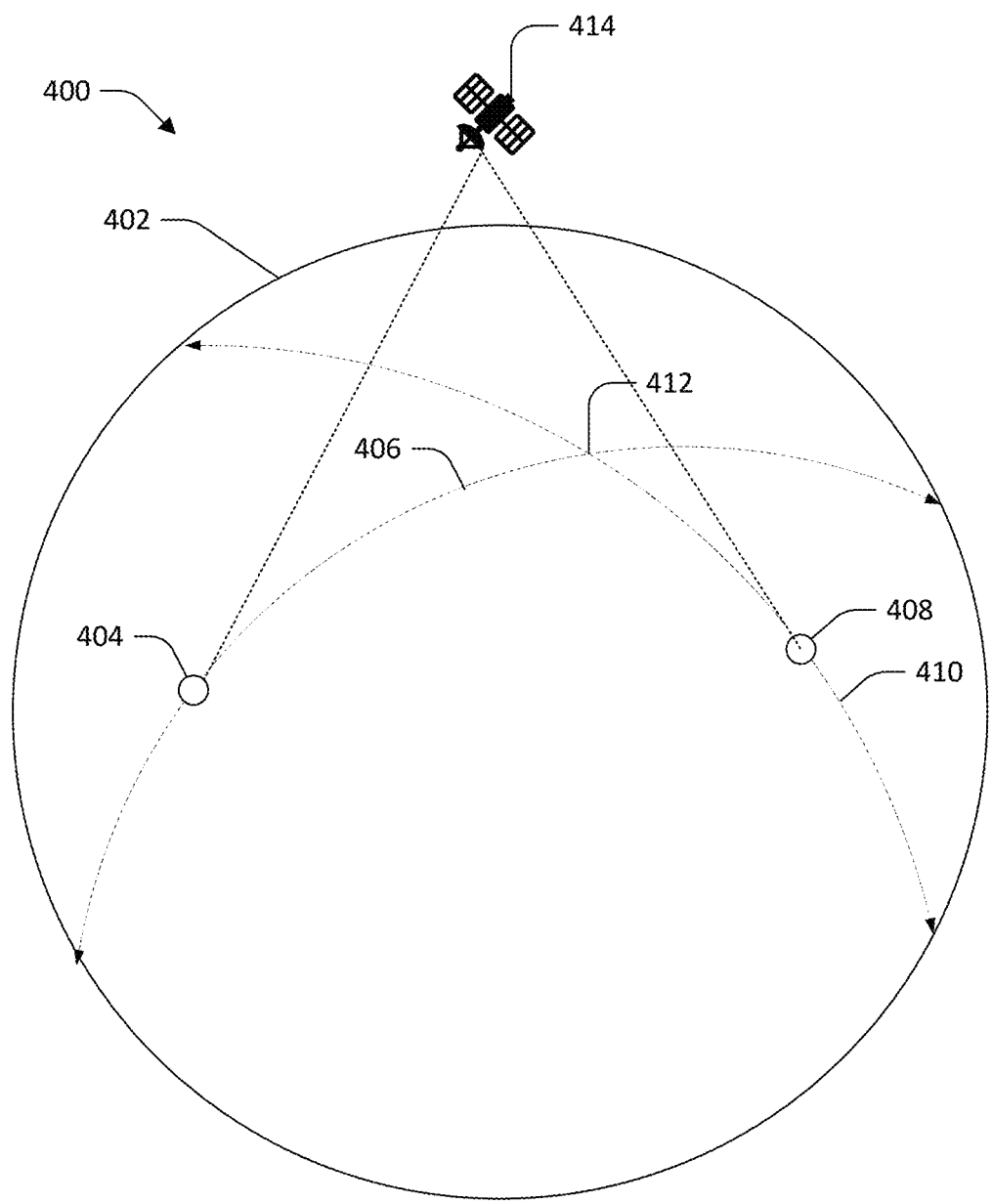
FIG. 4 is a schematic that illustrates computation of a location of a source of infrasonic signals.

In FIG. 4, illustrated is an exemplary embodiment 400 of a plurality of aeroseismometers 404 and 408 being used to compute a location of an infrasonic noise source 412. In an embodiment where there is a single aeroseismometer, the aeroseismometer can determine that the source of infrasonic signals lies somewhere along line 406 on planet 402. This narrows down the possible locations since the potential location is somewhere along the line 406 (where line 406 may be cone-shaped due to error and uncertainty). Given some knowledge of seismic features, fault lines, and geopolitical information, it may be possible to further narrow down the potential locations of the source, but there may still be uncertainty.

If there is a second aeroseismometer 408, however, that can determine a travel path of the infrasonic signal (line 410), a satellite 414, receiving both travel paths from aeroseismometers 404 and 408, can determine that the source of the infrasonic signal is at point 412, where the lines 406 and 410 intersect. In some embodiments, when the aeroseismometers 404 and 408 are close enough to one another, they can communicate their findings to each other, and they can independently determine that the location of the source is at 412.

Figure 5:
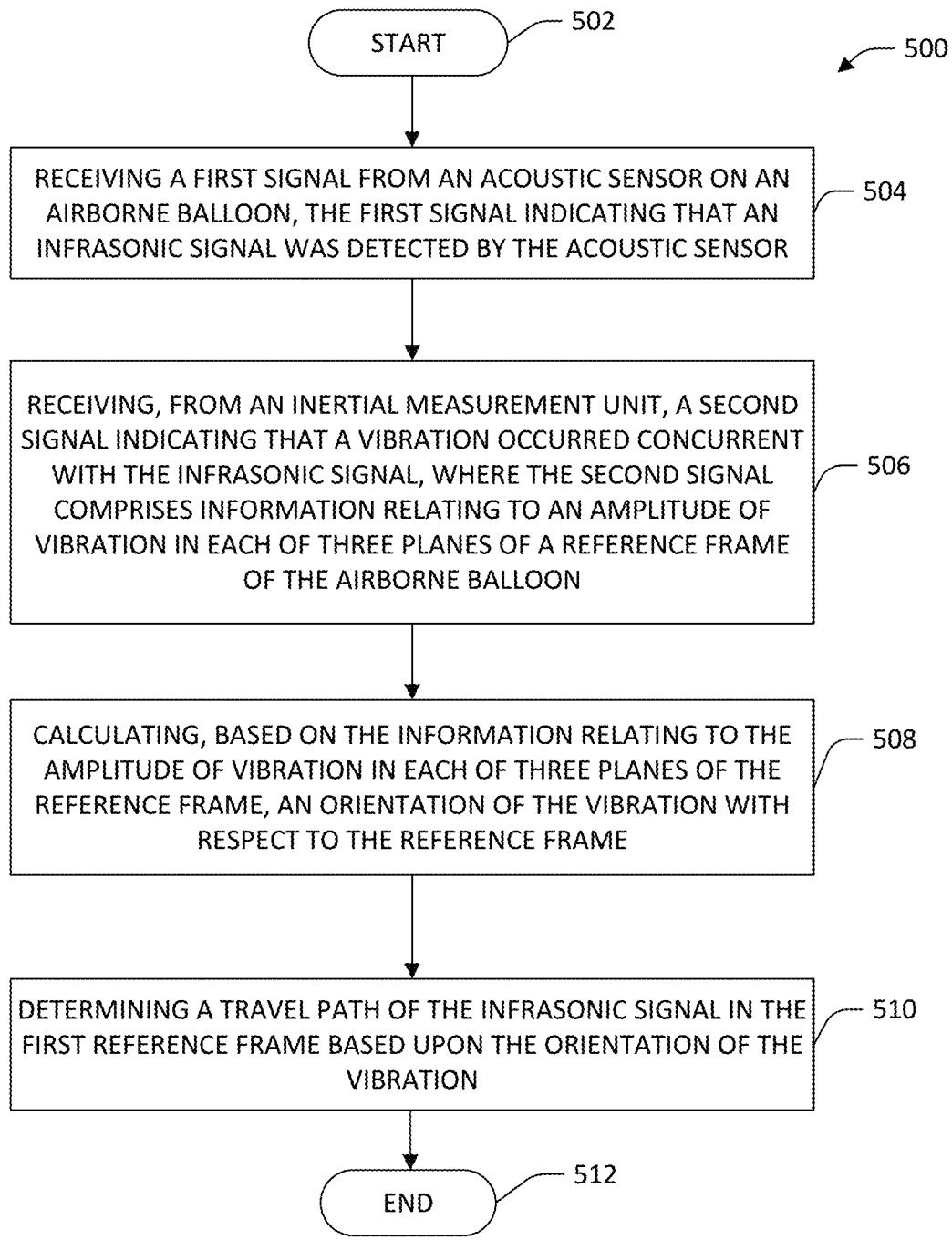
FIG. 5 is a flow diagram that illustrates an exemplary methodology for determining a travel path of an infrasonic signal.

FIG. 5 illustrates an exemplary methodology 500 relating to geolocation of infrasonic signal sources using balloon-borne aeroseismometers. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

The methodology 500 begins at 502, and at 504, a first signal is received from an acoustic sensor on an airborne balloon, where the first signal indicates that an infrasonic signal was detected by the acoustic sensor.

At 506, a second signal is received from an IMU, where the second signal indicates that a vibration of the balloon was detected by the IMU concurrently with the acoustic signal detecting the acoustic signal detecting the infrasonic signal. The second signal comprises information relating to an amplitude of vibration in each of the three planes of a reference frame of the airborne balloon.

At 508, an orientation of the vibration with respect to the IMU is calculated based upon on the information relating to the amplitude of vibration in each of the three planes of the reference frame of the airborne balloon.

At 510, a travel path of the infrasonic signal is computed relative to the reference frame, wherein the direction is coincident with the orientation of the vibration. The methodology 500 completes at 512.

Figure 6:
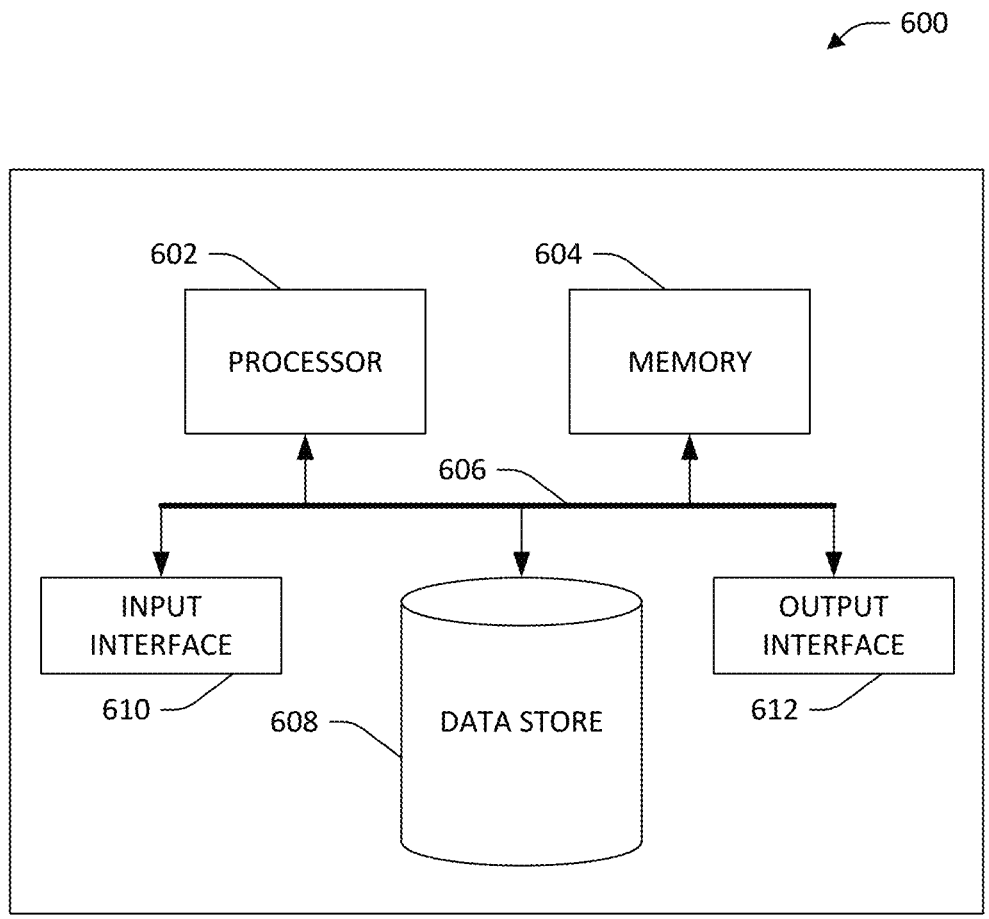
FIG. 6 is an exemplary computing system.

Referring now to FIG. 6, a high-level illustration of an exemplary computing device 600 that can be used in accordance with the systems and methodologies disclosed herein is illustrated. For instance, the computing device 600 may be included in the aeroseismometer 104 to geolocate infrasonic signal sources. By way of another example, the computing device 600 can be used in a system that can receive acoustic signals, acceleration information, determine that detected infrasonic signals correlate with vibrations, determine an orientation of the vibration in a reference frame, translate the orientation to an external reference frame, and then determine a set of potential locations in which the infrasound signal source may be located. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store both navigation information, information relating to geophysical features, etc.

The computing device 600 additionally includes a data store 608 that is accessible by the processor 602 by way of the system bus 606. The data store 608 may include executable instructions, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc., by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An airborne balloon that has a computing system coupled thereto, the computing system comprising:
    a processor; and
    memory storing instructions that, when executed by the processor, cause the processor to perform acts comprising:
        receiving, from an acoustic sensor that is in communication with the computing system on the airborne balloon, an indication that an infrasonic signal has been detected by the acoustic sensor;
        receiving, from at least one motion sensor that is in communication with the computing system on the airborne balloon, a signal indicating that a vibration of the airborne balloon occurred concurrently with the infrasonic signal being detected by the acoustic sensor, wherein the signal comprises directional information relating to movement in each of three planes of a reference frame of the airborne balloon; and
        computing, based upon the signal received from the at least one motion sensor, a direction of arrival of the infrasonic signal in the reference frame of the airborne balloon, wherein a source of the infrasonic signal is located along the travel path of the infrasonic signal.

2. The airborne balloon of claim 1, wherein the at least one motion sensor includes three motion sensors.

3. The airborne balloon of claim 1, the acts further comprising:
    receiving signals that are indicative of location of the airborne balloon and heading of the airborne balloon; and
    based upon the signals, computing the direction of arrival of the infrasonic signal in an external reference frame.

4. The airborne balloon of claim 3, wherein a location of the source of the infrasonic signal is estimated based upon the computed travel path of the infrasonic signal in the external reference frame.

5. The airborne balloon of claim 3, wherein the signals comprise a Global Positioning System (GPS) signal.

6. The airborne balloon of claim 3, wherein the signals comprise a second signal output by the at least one motion sensor.

7. The airborne balloon of claim 1, the acts further comprising:
    determining that the vibration of the airborne balloon was caused by the infrasonic signal, wherein the travel path of the infrasonic signal is computed in response to determining that the vibration of the airborne balloon was caused by the infrasonic signal.

8. The airborne balloon of claim 7, wherein determining that the vibration of the airborne balloon was caused by the infrasonic signal comprises performing a comparison between a sensor signal output by the acoustic sensor and the signal received from the at least one motion sensor, wherein the sensor signal output by the acoustic sensor and the signal received from the at least one motion sensor correspond to a same time window, and further wherein the vibration of the airborne balloon is determined to be caused by the infrasonic signal based upon the comparison.

9. The airborne balloon of claim 1, wherein the source of the infrasonic signal is a geophysical or anthropogenic event.

10. The airborne balloon of claim 1, wherein the at least one accelerometer is included in an inertial measurement unit.

11. The airborne balloon of claim 1, wherein a notification is output to an analyst based upon the travel path of the infrasonic signal.

12. A method performed by a computing system of an aeroseismometer mounted to an airborne balloon, the method comprising:
    receiving a first signal from an acoustic sensor coupled to the airborne balloon, the first signal representing an infrasonic signal that has been detected by the acoustic sensor;
    receiving a second signal from an inertial measurement unit coupled to the airborne balloon, the second signal representing vibration of the airborne balloon, wherein the second signal comprises information that is indicative of an orientation of the vibration of the airborne balloon; and
    based upon the first signal and the second signal, computing a direction of arrival of the infrasonic signal relative to the airborne balloon, wherein a source of the infrasonic signal lies upon the travel path of the infrasonic signal.

13. The method of claim 12, wherein the information that is indicative of the orientation of the vibration comprises:
    a first amplitude of the vibration in a first plane;
    a second amplitude of the vibration in a second plane, wherein the second plane is orthogonal to the first plane; and
    a third amplitude of the vibration in a third plane, wherein the third plane is orthogonal to the first plane and the second plane.

14. The method of claim 13, wherein the first plane, the second plane, and the third plane correspond to axes of a reference frame of the airborne balloon.

15. The method of claim 14, wherein the travel path of the infrasonic signal is computed in the reference frame of the airborne balloon, and wherein the method further comprises:
    translating the travel path of the infrasonic signal from the reference frame to an external reference frame, wherein the travel path is translated from the reference frame to the external reference frame based upon location data generated by a Global Positioning System (GPS) sensor mounted to the airborne balloon.

16. The method of claim 15, further comprising:
  determining that the vibration represented by the second signal is caused by the infrasonic signal represented by the first signal being incident upon the airborne balloon, wherein the direction of arrival of the infrasonic signal is computed responsive to determining that the vibration is caused by the infrasonic signal.

17. The method of claim 12, further comprising transmitting the travel path to a ground station that is configured to estimate the location of the source of the infrasonic signal based upon the travel path.

18. An aeroseismometer coupled to an airborne balloon, the aeroseismometer comprising:
  an acoustic sensor that is configured to generate a first signal, the first signal being representative of an infrasonic signal that is incident upon the airborne balloon;
  an inertial measurement unit that is configured to generate a second signal, the second signal being representative of a vibration of the airborne balloon caused by the infrasonic signal being incident upon the airborne balloon, wherein the second signal comprises information that is indicative of an orientation of the vibration in a reference frame of the aeroseismometer; and
  a computing device that is configured to identify a travel path of the infrasonic signal relative to the aeroseismometer, wherein the travel path is computed by the computing device based upon the first signal and the second signal, and further wherein the computed travel path of the infrasonic signal corresponds to the orientation of the vibration in the reference frame.

19. The aeroseismometer of claim 18, further comprising a location sensor that is configured to generate a third signal that is representative of a location of the aeroseismometer in a planetary coordinate system, wherein the computing device identifies the travel path of the infrasonic signal based further upon the third signal.

20. The aeroseismometer of claim 18, wherein the inertial measurement unit comprises multiple accelerometer that respectively output amplitudes of the vibration in multiple planes of the reference frame.

* * * * *